Jan. 14, 1941.　　　　G. E. GAREY　　　　2,228,389
BASIN MACHINE
Filed March 3, 1939　　　　3 Sheets-Sheet 1
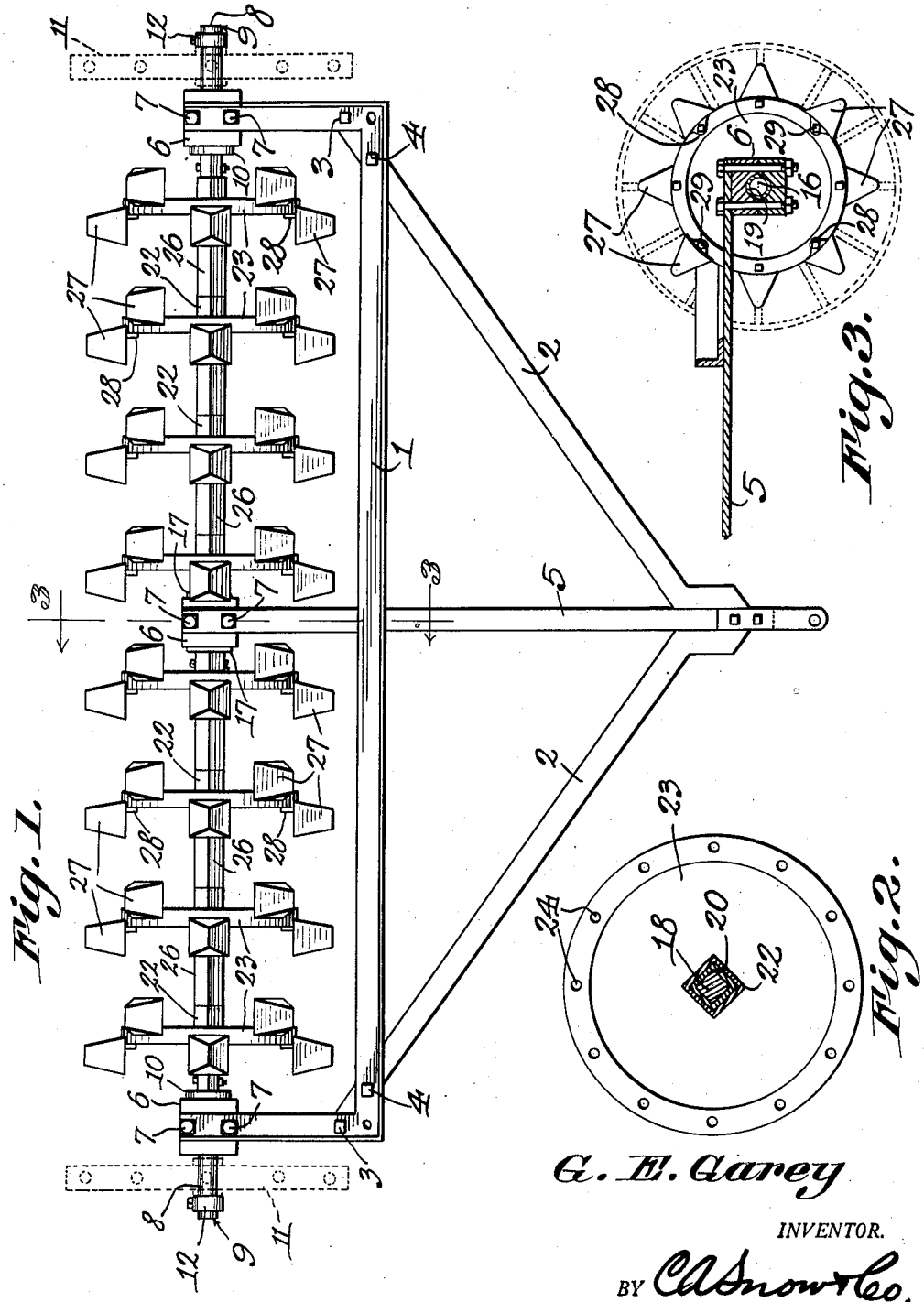
G. E. Garey
INVENTOR.
BY CASnow&Co.
ATTORNEYS.

Jan. 14, 1941.　　　G. E. GAREY　　　2,228,389
BASIN MACHINE
Filed March 3, 1939　　　3 Sheets-Sheet 2
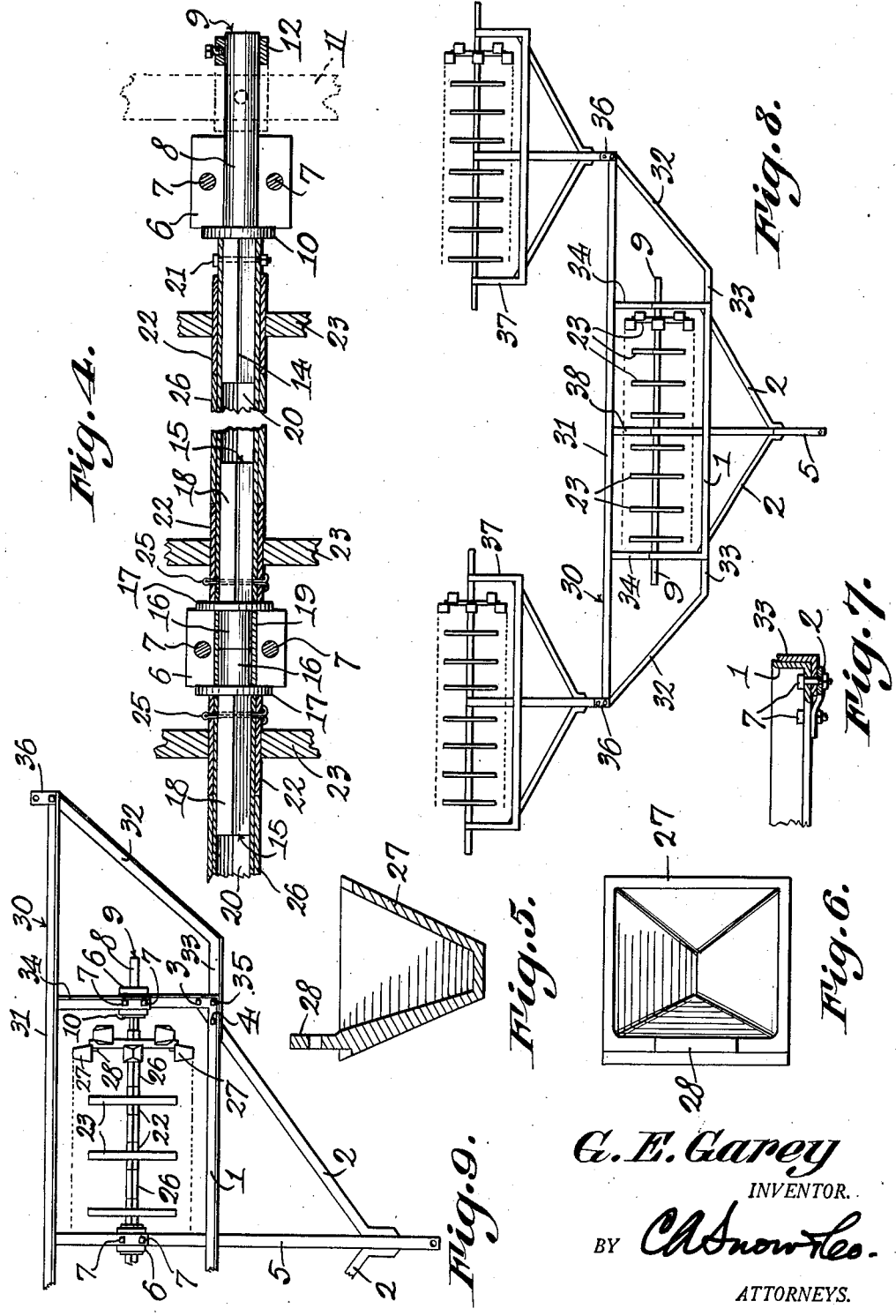

Jan. 14, 1941.  G. E. GAREY  2,228,389
BASIN MACHINE
Filed March 3, 1939   3 Sheets-Sheet 3

G. E. Garey
INVENTOR.
BY C. A. Snow & Co.
ATTORNEYS.

Patented Jan. 14, 1941

2,228,389

UNITED STATES PATENT OFFICE 2,228,389

BASIN MACHINE

George E. Garey, Downs, Kans.

Application March 3, 1939, Serial No. 259,700

4 Claims. (Cl. 97—52)

In this application, there is shown an agricultural machine, so constructed that, when drawn over the ground, basins will be formed in the soil, for the purpose of holding water and preventing the top soil from being blown away, the ground remaining rough on its surface, and the soil being prevented from being blown about.

In the springtime, when the ground has settled, the machine may be advanced over cracked ground, wherein the cracks have been caused by freezing, or it may be run over wheat ground or the like, to prevent the soil from blowing away.

The machine serves to perforate the ground, after the plowing has been completed, the perforations extending into the soil to a depth of several inches, and sunlight being admitted to the soil. The machine functions as a sub-surface packer, which presses heavy stubble firmly under the plowing, air pockets being removed, and the moisture being held in the sub-soil, the basins produced functioning to catch and hold water. It is to be observed that the device is so constructed that it will pack basins in the ground, rather than loosen the soil and dig holes. Ordinarily, the soil is harrowed, but harrowing leaves the surface of the ground so smooth that it will cement over, the top soil and the surface water then running away.

The invention aims, further, to provide, in a machine of the sort under consideration, a rotor in cluding wheels equipped with lugs so constructed that they will penetrate deeply into newly plowed ground, the lugs, nevertheless, being blunted to such an extent that they will not cut vegetation, for instance wheat. Another object of the invention is to provide a device of the class described in which there will be no pulverization of the soil, the soil remaining in its natural and rough state, with small clods on top, and with properly packed basins.

A further object of the invention is to provide novel means for mounting and connecting the wheels of the rotors, which include the lugs.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows, in top plan, a device constructed in accordance with the invention;

Fig. 2 is a transverse section disclosing the wheel of the rotor and attendant parts;

Fig. 3 is a section on the line 3—3 of Fig. 1;

Fig. 4 is a longitudinal section taken through the axle and associated shafts;

Fig. 5 is a section showing one of the lugs;

Fig. 6 is a bottom plan of the lug;

Fig. 7 is a sectional view illustrating one of the connections between the main frame and the supplemental frame;

Fig. 8 is a diagrammatic plan, illustrating the implement as it will appear when the supplemental frame is associated with the main frame;

Fig. 9 is a fragmental top plan, showing the relation between the main and auxiliary or supplemental frames;

Figure 10:
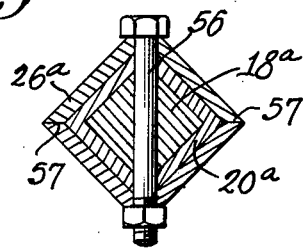
Fig. 10 is a transverse section on the line 10—10 of Fig. 11, illustrating a modification in the spacer.

Referring, first, to Figs. 1 to 9, there is provided, as shown best in Fig. 1, a U-shaped main frame 1, to the forward corners of which, forwardly converging braces 2 are attached, by securing elements 3 and 4. The securing elements 4 are located in the front bar of the main frame 1, and the securing elements 3 are located in the rearwardly presented side arms of the frame. A draft tongue 5 extends backwardly, under the front bar of the frame 1, the forward ends of the braces 2 being secured to the tongue. On the rear end of the tongue 5, and on the rear ends of the side arms of the main frame 1, bearings 6 are held, by securing elements 7.

The cylindrical portions 8 of outer axles 9 are journaled in the bearings 6 on the side arms of the main frame 1, the axles 9 having disks 10 which engage the inner surfaces of the said bearings. When it is desired to transport the machine along a highway, ground wheels 11 may be held on the cylindrical portions 8 of the outer axles 9, by set collars 12 or the like. The outer axles 9 have inwardly extended polygonal ends 14.

Any desired number of intermediate axles 15 may be supplied, the axles 15 including cylindrical parts 16, disks 17, and polygonal ends 18. The cylindrical parts 16 of the intermediate axles 15 are received for rotation in a tubular spacer 19, located between the disks 17, and mounted in the bearing 6 that is carried by the rear end of the tongue 5. The polygonal ends 14 of the outer axles 9, and the polygonal ends 18 of the intermediate axles 15, are received within polygonal shaft sections 20, extended between the disks 10 and 17. The polygonal shaft sections 20 are secured at 21 to the polygonal ends 14 of the outer axles 9. The polygonal shaft sections 20 are adapted to receive the polygonal hubs 22 of disk like wheels 23, forming parts of soil engaging rotors. The wheels 23, as shown in Fig. 2, form parts of a soil-engaging rotor, and are supplied near their peripheries with transverse openings 24. The hubs 22 of the innermost wheels 23 are secured at 25 to the polygonal ends 18 of the intermediate axles 15. Between the hubs 22 of the wheels 23 are located polygonal spacers 26, mounted on the polygonal shaft sections 20.

Disposed on opposite sides of each wheel 23, in circumferentially alternating relation, are hollow lugs 27, having perforated ears 28, which overlap the sides of the wheels 23, as shown in Fig. 3, securing elements 29, such as bolts, passing through the ears 28 and through the openings 24 of the wheels 23, to hold the lugs in place.

The lugs 27 are blunted at their outer ends, so that they will not cut vegetation, and they have a double slant, that is, a slant circumferentially of each wheel 23, and a slant transversely of the wheel. The slant of the lugs is such that the lugs will penetrate the soil and form basins, without cutting vegetation, the lugs supporting the peripheries of the wheels 23, out of contact with the soil, a pulverizing of the soil thus being prevented. The device is operated by drawing it over the ground, through the instrumentality of the tongue 5, the wheels 11 being used only for transportation purposes, to prevent damage to a highway.

At times it may be desirable to pulverize a wider zone than can be handled by the structure shown in Fig. 1, and, then, recourse is had to the arrangement shown in Fig. 8 of the drawings.

Under such circumstances, recourse is had to a supplemental frame 30, including a back bar 31, and forwardly converging sides 32 having inwardly projecting fingers 33, disposed parallel to the back bar 31. Bracket bars 34 project forwardly from the rear bar 31 and are disposed at right angles thereto.

The fingers 33 of the supplemental frame 30 are attached to the forward corners of the main frame 1, by the securing elements 4 and by additional securing elements 35. The forwardly extended bracket bars 34 of the supplemental frame 30 are secured to the side arms of the main frame 1, and to the rear portion of the tongue 5, by the securing devices 7 that hold the bearings 6 in place.

At its outer, rear corners, and elsewhere if desired, the rear bar 31 of the supplemental frame 30 is supplied with connections 36, to which may be attached, in any desired manner, soil pulverizing instrumentalities 37 which are duplicates of the structure shown in Fig. 1. A single form of unit, only, is necessary. One of those units may be employed as shown in Fig. 1, or three or more of them may be employed, as depicted in Fig. 8.

The device of Fig. 8 of course operates on a wider strip of soil than the single form shown in Fig. 1.

Figure 11:
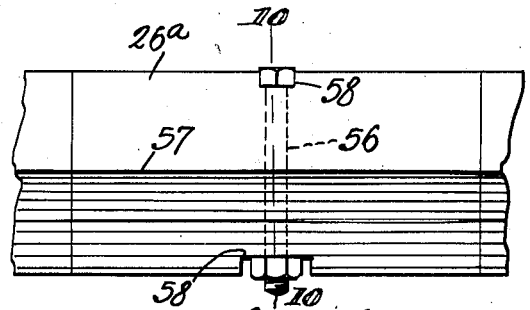
Fig. 11 is an elevation of the structure shown in Fig. 10.

In Figs. 10 and 11, parts shown in Fig. 4 are designated by numerals already used, with the suffix $a$. The spacer 26$a$ is made in laterally separable parts, as shown at 57, held in place by a securing element 56, such as a bolt, the head of the bolt and the nut of the bolt being received in seats 58 in the parts of the spacer 26$a$.

Figure 12:
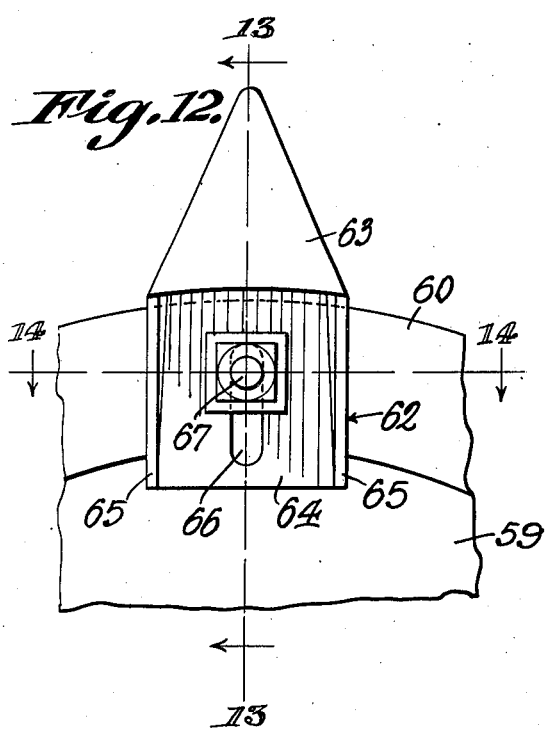
Fig. 12 is an elevation showing a modified means for holding the lug in place.
Figure 13:
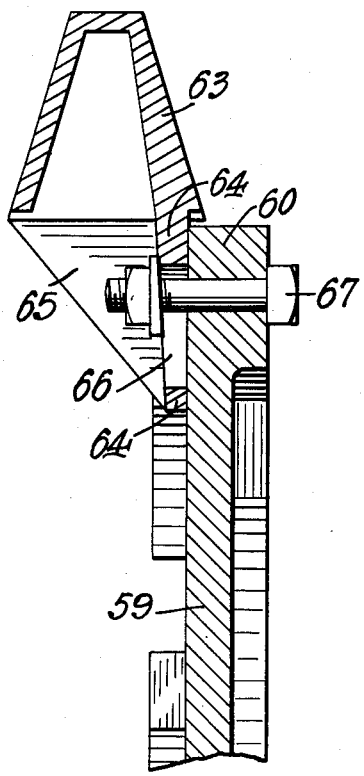
Fig. 13 is a section on the line 13—13 of Fig. 12.
Figure 14:
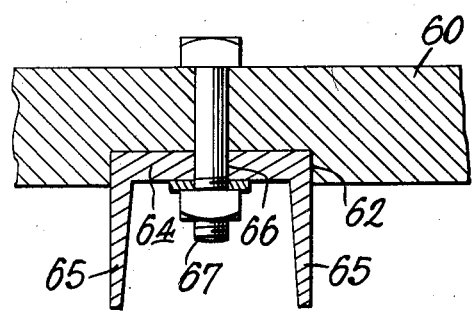
Fig. 14 is a section on the line 14—14 of Fig. 12.

In Figs. 12, 13 and 14, the wheel is shown at 59 and has a rim 60, provided with side seats or notches 62. The lug is shown at 63 and has an ear or flange 64 connected to the butt of the lug by buttresses 65. The ear 64 is received in the seat 62, and has an elongated slot 66 for the reception of a securing element 67, connecting the lug to the wheel 59.

Some tractors move at a comparatively high rate of speed, and the rotor, if too small in diameter, will rotate rapidly and throw the dirt. The effective diameter of the rotor wheel can be increased, and the undesirable result above referred to obviated, by moving the lugs 63 outwardly and holding them in adjusted positions, by means of the securing element 67, the slot 66 providing for such an adjustment.

Having thus described the invention, what is claimed is:

1. In a machine of the class described, a rotor including a wheel, and spaced, soil packing, outstanding lugs of pyramidal form and of approximately the same base width as height, mounted on the wheel, in circumferentially spaced relation and in laterally offset relation to the wheel.

2. In a machine of the class described, a frame, axle members having polygonal parts, and cylindrical parts journaled on the frame, polygonal shaft sections receiving the polygonal parts of the axle members, soil-engaging rotor wheels having polygonal hubs receiving the shaft sections, and polygonal spacers on the shaft sections and interposed between the hubs of the rotor wheels.

3. A machine of the class described, constructed as set forth in claim 2, and wherein the spacers are composed of laterally separable parts, and means for holding said parts together, and on the shaft sections.

4. In a machine of the class described, a frame, a wheel supported for rotation on the frame and provided with a seat in its side, a lug located at said side of the wheel and having a projecting ear received in the seat for adjustment radially of the wheel, a buttress connecting the base of the lug to the ear, and means for attaching the ear to the wheel to permit an adjustment of the lug radially of the wheel, said means including a movable portion which is set inwardly from the outer edge of the buttress, the lug overhanging said movable portion.

GEORGE E. GAREY.